United States Patent
Guindulain Vidondo

(10) Patent No.: US 6,672,482 B2
(45) Date of Patent: Jan. 6, 2004

(54) DIRECT SUGAR DISPENSING SYSTEM IN AUTOMATIC HOT BEVERAGE VENDING MACHINES

(75) Inventor: Félix Guindulain Vidondo, Peralta (ES)

(73) Assignee: Jofemar, S.A., Peralta (ES)

( * ) Notice: Subject to any disclaimer, the term of this patent is extended or adjusted under 35 U.S.C. 154(b) by 0 days.

(21) Appl. No.: 10/121,521

(22) Filed: Apr. 12, 2002

(65) Prior Publication Data

US 2002/0166872 A1 Nov. 14, 2002

(30) Foreign Application Priority Data

May 4, 2001 (ES) .......................................... 200101019

(51) Int. Cl.[7] ................................................. B67D 5/56
(52) U.S. Cl. ...................... 222/129.3; 222/413; 222/504
(58) Field of Search ........................... 222/129.1, 129.3, 222/129.4, 413, 504

(56) References Cited

U.S. PATENT DOCUMENTS

| | | | | |
|---|---|---|---|---|
| 2,671,575 A | * | 3/1954 | Hilton ..................... | 222/129.3 |
| 2,954,145 A | * | 9/1960 | McCauley ................ | 222/129.4 |
| 3,439,717 A | * | 4/1969 | Bode ........................ | 222/129.3 |
| 3,648,904 A | * | 3/1972 | Teige ........................ | 222/413 |
| 4,245,680 A | * | 1/1981 | Greenfield et al. ...... | 222/129.3 |
| 4,324,494 A | * | 4/1982 | Pryor et al. .............. | 222/129.3 |
| 4,444,336 A | * | 4/1984 | Nielsen ................... | 222/129.4 |
| 4,911,332 A | | 3/1990 | King | |
| 5,330,078 A | * | 7/1994 | Ficken et al. ............ | 222/129.4 |

OTHER PUBLICATIONS

Japanese Abstract, No. JP10340385, Moribe Tomohisa, Hoshizaki Electric Co. Ltd., Canister, Mar. 31, 1999.

* cited by examiner

Primary Examiner—Kenneth Bomberg
(74) Attorney, Agent, or Firm—Klauber & Jackson

(57) ABSTRACT

Direct sugar dispensing system in automatic hot beverage vending machines, being of the type of automatic hot beverage vending machines, for beverages such as coffee, tea or hot chocolate, in whose selection a cup (4) is provided which the selected product is poured into. There are also other elements, in such a way that the sugar storage compartment (5) is assembled with its outlet over the receiving point of the cups (4) which the selected product is poured into and close to them. In the sugar outlet for direct dispensing into the corresponding cup (4) which the selected product is poured into, there is a gate (13) operated by a motor or coil (14).

1 Claim, 3 Drawing Sheets

DIRECT SUGAR DISPENSING SYSTEM IN AUTOMATIC HOT BEVERAGE VENDING MACHINES

OBJECT OF THE INVENTION

As expressed in the title of the present specification, the following invention refers to a direct sugar dispensing system in automatic hot beverage vending machines, being of the known type of automatic hot beverage vending machines dispensing coffee, tea, hot chocolate, etc., whose machines have a set of product selection push buttons and a selected product receiving box, as well as other elements, among which we can consider the sugar compartment from where the sugar is led to the cup which the selected product is poured into. Said sugar storage compartment is separated from the receiving point of the cup the selected product is poured into.

The present specification describes a direct sugar dispensing system from the storage compartment to the cup which the selected product is poured into, having in the sugar outlet of the storage compartment a protective gate operated by a coil or a motor.

Hence, the sugar storage compartment is assembled over the positioning point, in the receiving box, of the cups which the selected product is poured into and close thereto, the sugar falling by simple gravity directly into the corresponding cup.

On the other hand, the protective gate of the sugar outlet of the storage compartment is capable of being operated in order to adopt a second position, separating from the sugar outlet, in order to permit the dispensing of sugar, while in its first inoperative and protective position it remains connected to the outlet acting as a protective element against steam and moisture.

TECHNICAL FIELD

The direct sugar dispensing system is especially applicable to automatic hot beverage vending machines, for beverages such as coffee, hot chocolate and other teas, where the users select the product, and, besides the user can select whether he wants the beverage with or without sugar.

BACKGROUND OF THE INVENTION

Automatic hot beverage vending machines conventionally have a set of product selection push buttons, a receiving box for the cups which the selected product is poured into, as well as a series of storage compartments for different products and elements, such as espresso coffee, decaffeinated coffee, milk, chocolate, sugar, cups, stirrers or spoons, etc.

In this way, once a user has selected a product, the respective cup which the selected product is poured into is placed in the box that the machine has for this purpose and the corresponding systems of the machine for dispensing a stirrer or spoon, sugar, if it has been selected by the user, and the selected product or products, are actuated.

On the other hand, the sugar storage compartment is separated from the receiving point of the cups the selected product is poured into, in such a way that the sugar is dispensed by means of a duct whose free end finishes in a jointed section so that the dispensing of the sugar is directed towards the corresponding cup which the product is poured into, whereas in its inoperative position it tilts upward, trying to prevent the duct from having a very moist surface, which with the passing of time leads to an accumulation of traces of sugar and the subsequent lumping thereof.

This is so, given that, as it is known, in automatic hot beverage vending machines steam is produced and there is a lot of moisture, which makes the accumulation of the traces of moist sugar dry to the point that they get lumpy and hence the sugar dispensing duct gets clogged, which represents a serious problem.

The dosed dispensing of sugar from the storage compartment is produced by a dosing element of the doses to be dispensed. Said element may be comprised of a worm screw, which in its appropriate rotation dispenses the previously determined amount, which moves towards the duct that leads it to the cup which the selected product is poured into.

DESCRIPTION OF THE INVENTION

The present specification describes a sugar dispensing system in automatic hot beverage vending machines, being of the type of automatic hot beverage vending machines, for beverages such as coffee, tea, or hot chocolate, in whose selection a cup is provided for the selected product to be poured into, as well as other elements, in such a way that the sugar storage compartment is assembled with its outlet over the receiving point of the cups which the selected product is poured into and close to them. In the sugar outlet for direct dispensing into the corresponding cup which the selected product is poured into, there is a gate that can be operated by a motor or coil.

The protective gate of the direct dispensing outlet of the sugar from the storage compartment thereof to the cups which the selected product is poured into is defined by an angulate sheet-like body, which in a first inoperative position is connected to the sugar outlet and in a second position, collapsed by the operation of a motor or coil, it releases it, permitting the discharge and direct dispensing of the sugar into the corresponding cup where the selected product is poured.

In this way, the steam produced is deviated preventing the moisture from impregnating the sugar stored in the outlet of the storage compartment and preventing the sugar from getting lumpy.

On the other hand, the system that is described has the big advantage that in the hypothetical case that the moisture and steam produced could cause the sugar close to the outlet of the storage compartment to get somewhat lumpy, in the dispensing operation, the dosing mechanism itself will act directly on the sugar causing it to be released, acting as a clog preventing element, thus avoiding any type of clogging, with the big advantage that this represents.

In order to complete the description that is going to be made hereinafter and for the purpose of providing a better understanding of the characteristics of the invention, the present specification is accompanied by a series of diagrams, in whose figures, the most characteristic details of the invention are represented in an illustrative and non-restrictive manner.

DESCRIPTION OF A PREFERRED EMBODIMENT

Figure 1:
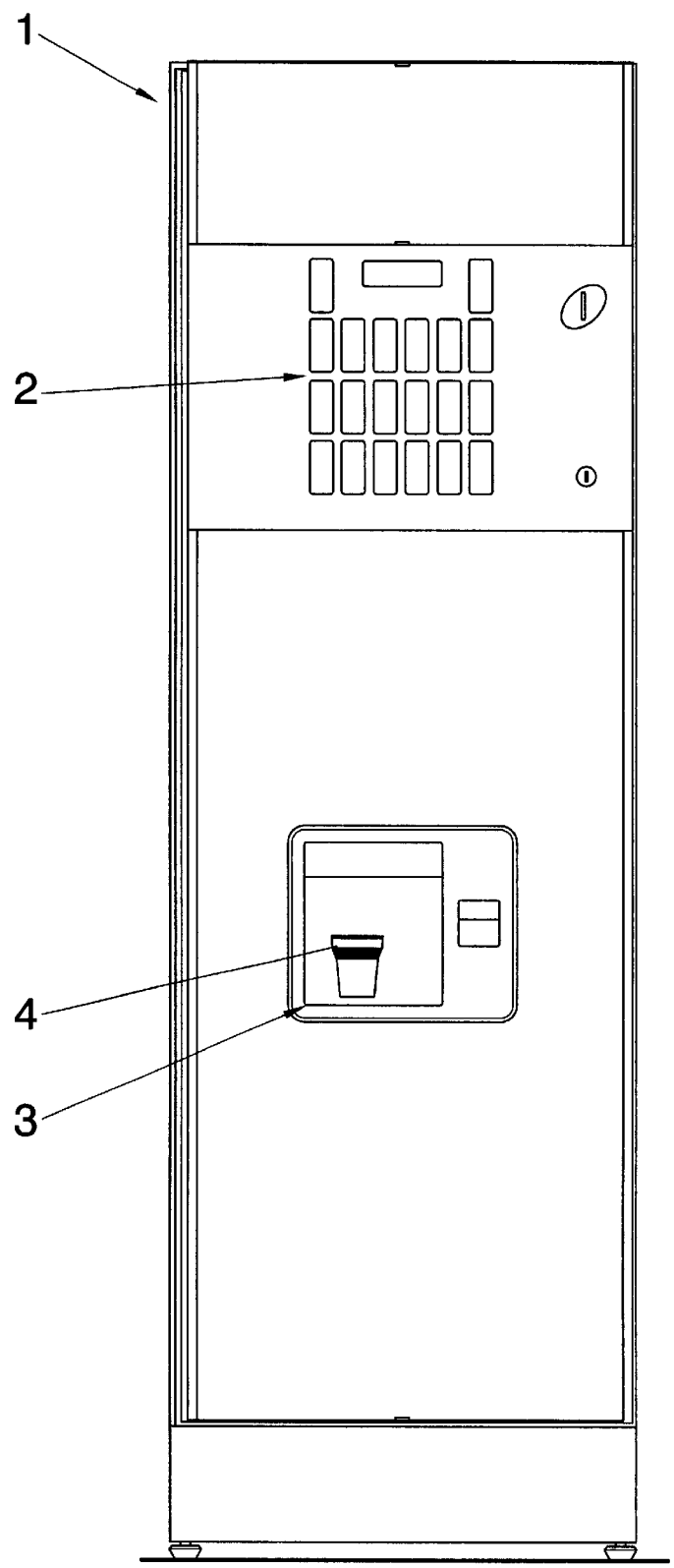
FIG. 1 shows a front view of an automatic hot beverage vending machine, showing the different product selection push buttons, as well as the receiving box of the cups the products are poured into.

In view of the commented figures and in accordance with the numbering used, we can see how the automatic hot beverage vending machine (1), for beverages such as coffee, tea or hot chocolate, has a set of product selection push buttons (2) and a receiving and collecting box (3) of the cups (4) which the selected product has been poured into.

The automatic hot beverage vending machine (1) includes a series of storage compartments of different elements and products, and, also includes the stirrer and spoon compartment (6), the cup storage compartment (7), the sugar storage compartment (5) and some storage compartments (8), (9), (10) and (11) of different products that can be selected by users, such as espresso coffee, milk, hot chocolate or decaffeinated coffee.

In the different attached drawings, one can see how the sugar storage compartment (5) is over the receiving point of the cups (4) which the selected product is poured into and close to them, in such a way that the dispensing of the sugar is done directly, by simple gravity, to the cups (4) since the sugar outlet of the storage compartment (5) is positioned over them. The sugar is dispensed in a dosed manner in accordance with a pre-established amount.

Hence, in the dispensing of sugar from the storage compartment (5), the storage compartment includes a worm screw (12) which in its specific rotation dispenses the corresponding dose of sugar.

Besides, the sugar outlet of the storage compartment (5) is protected by an angulate sheet-like gate (13) operated by a motor or coil (14), whose gate (13) can adopt two positions, a first protective position of the sugar outlet and a second collapsed position that releases the outlet to permit the adequate dispensing of sugar into the cup (4) which the selected product is poured into.

In this way, with the gate (13) in a first protective position of the sugar outlet of the compartment (5), connected thereto, it acts as a protective element against existing steam and moisture, in order to prevent the sugar in the storage compartment outlet from becoming lumpy.

On the other hand, with the gate (13) in a second collapsed position by the operation of the motor or coil (14), the sugar outlet is released permitting the direct dispensing thereof by simple gravity to the corresponding cup (4) positioned in the box (3) and under said outlet.

Figure 2:
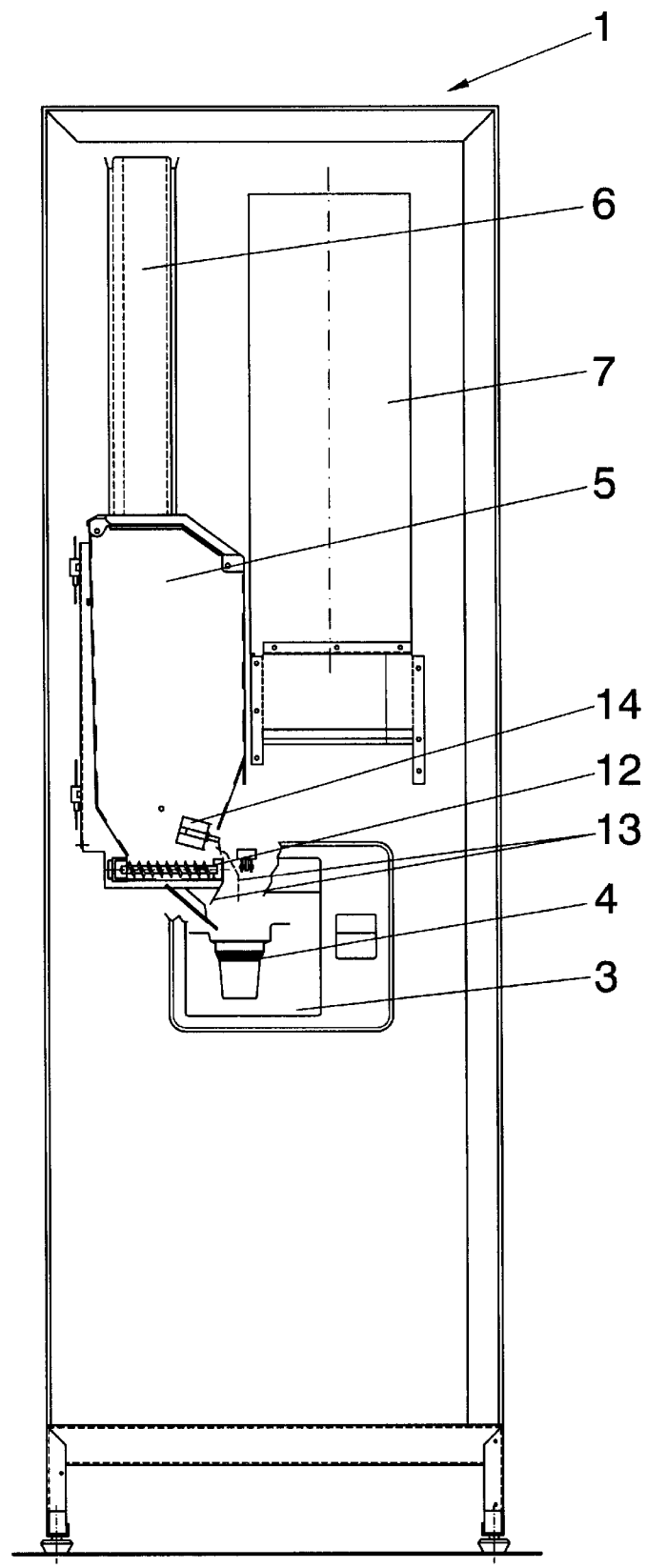
FIG. 2 shows a front view of the inside components of the automatic hot beverage vending machine of the preceding figure, showing how the sugar storage compartment is assembled in the receiving point of the cups the selected product is poured into, as well as the protective gate of the sugar outlet.
Figure 3:
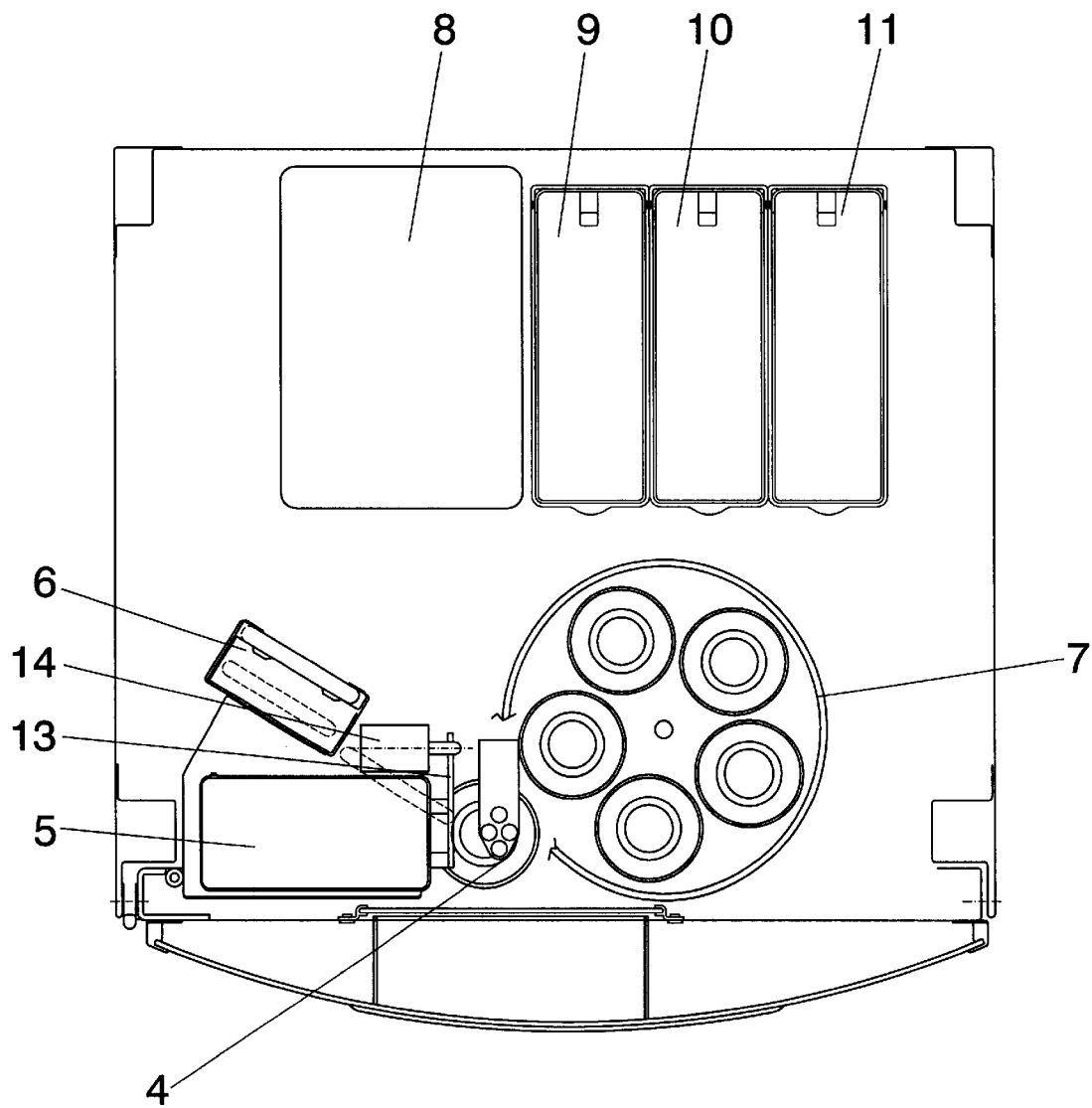
FIG. 3 shows a plan view of the automatic hot beverage vending machine of the preceding figures, showing the different storage compartments of the different products, as well as the operating coil of the protective gate of the sugar outlet.

FIG. 2 of the attached drawings shows how the gate (13) represented by a continuous line is positioned in a first protective position of the sugar outlet of the storage compartment (5), and in a second position the gate, represented by a broken line, has been collapsed by the operation of the motor or coil (14) releasing the sugar outlet permitting its direct dispensing into the corresponding cup (4) located in the box (3) for the pouring of the selected product.

Hence, the gate (13) in its first protective position of the sugar outlet of the storage compartment (5), acts as a protective element against existing steam and moisture, preventing a possible lumping of the sugar in the outlet area, but given that the dispensing of the sugar is carried out directly by the action of a worm screw (12), although a hypothetical lumping of the sugar in the outlet area were to take place, the action itself of the worm screw (12) would break up said lump. Hence, there is a totally reliable clog preventing system.

What is claimed is:

1. A direct sugar dispensing system in automatic hot beverage vending machines for selected products such as coffee, tea or hot chocolate, comprising: cups for selected products to be poured into; a receiving point of the cups; a sugar storage compartment provided with an outlet, said outlet being located over the receiving point of the cups; a gate operated by an actuating element selected from a motor and a coil; provided at the outlet of the sugar storage compartment; wherein the gate comprises an angular sheet-like body having:

a first inoperative position in which the gate is closing the outlet of the sugar storage compartment and;

a second position in which the gate is dejected by means of the operation of the actuating element so as to release the outlet and permit discharge and direct dispensing of sugar into a cup.

* * * * *